United States Patent
Lopez et al.

(10) Patent No.: US 12,520,340 B2
(45) Date of Patent: Jan. 6, 2026

(54) CONTROL OF UPLINK WIRELESS TRANSMISSIONS IN SHARED TXOP

(71) Applicant: Telefonaktiebolaget LM Ericsson (publ), Stockholm (SE)

(72) Inventors: Miguel Lopez, Solna (SE); Leif Wilhelmsson, Lund (SE); Dennis Sundman, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 476 days.

(21) Appl. No.: 17/908,259

(22) PCT Filed: Mar. 6, 2020

(86) PCT No.: PCT/EP2020/056109
§ 371 (c)(1),
(2) Date: Aug. 31, 2022

(87) PCT Pub. No.: WO2021/175448
PCT Pub. Date: Sep. 10, 2021

(65) Prior Publication Data
US 2023/0087687 A1    Mar. 23, 2023

(51) Int. Cl.
*H04W 74/0816* (2024.01)
*H04W 74/00* (2009.01)

(52) U.S. Cl.
CPC ..... *H04W 74/006* (2013.01); *H04W 74/0816* (2013.01)

(58) Field of Classification Search
CPC ........... H04W 74/006; H04W 74/0816; H04W 74/04
See application file for complete search history.

(56) References Cited

U.S. PATENT DOCUMENTS

2014/0233734 A1    8/2014  Ram et al.
2017/0201981 A1*   7/2017  Huang ............... H04W 74/0816
(Continued)

OTHER PUBLICATIONS 802.11 Working Group of the LAN, "IEEE P802.11ax™/D6.0", Draft Standard for Information technology—Telecommunications and information exchange between systems Local and metropolitan area networks—Specific requirements, Part 11: Wireless LAN Medium Access Control (MAC) and Physical Layer (PHY) Specifications, Nov. 2019, 1-780.
(Continued)

*Primary Examiner* — Michael J Moore, Jr.
*Assistant Examiner* — Sang C Lee
(74) *Attorney, Agent, or Firm* — Murphy, Bilak & Homiller, PLLC

(57) ABSTRACT

A wireless device (11) configures a carrier for communication with a serving access point (10). The wireless device (11) maintains a virtual carrier sense timer. The virtual carrier sense timer indicates that the carrier is to be regarded as occupied as long as the virtual carrier sense timer is not expired. The wireless device (11) receives one or more wireless transmissions on the carrier. The one or more wireless transmissions each include: an identifier commonly assigned to multiple access points which cooperate by sharing a transmission opportunity, and a duration field for indicating a duration for which the carrier is expected to be occupied. In response to the identifier matching an identifier of the serving access point (11), the wireless device (11) updates the virtual carrier sense timer according to the indicated duration. Based on the virtual carrier sense timer, the wireless device (11) controls one or more UL wireless transmissions from the wireless device (11).

22 Claims, 12 Drawing Sheets

(56) References Cited

U.S. PATENT DOCUMENTS

| | | | | |
|---|---|---|---|---|
| 2018/0063824 A1* | 3/2018 | Kim | ................ | H04W 84/12 |
| 2018/0084579 A1* | 3/2018 | Tian | ................ | H04W 74/0816 |
| 2018/0084584 A1* | 3/2018 | Umehara | ................ | H04W 74/0816 |
| 2018/0124806 A1* | 5/2018 | Kim | ................ | H04W 72/0446 |
| 2018/0324855 A1* | 11/2018 | Huang | ................ | H04W 74/0808 |
| 2018/0324859 A1* | 11/2018 | Kim | ................ | H04W 74/0816 |
| 2019/0200387 A1* | 6/2019 | Chitrakar | ................ | H04W 48/12 |
| 2020/0076519 A1* | 3/2020 | Asterjadhi | ................ | H04L 1/0027 |
| 2020/0245352 A1* | 7/2020 | Seok | ................ | H04W 72/29 |
| 2021/0111855 A1* | 4/2021 | Verma | ................ | H04W 72/044 |

OTHER PUBLICATIONS

Verma, Lochan, et al., "Coordinated AP Time/Frequency Sharing in a Transmit Opportunity in 11be", doc.: IEEE 802.11-19/1582r1, Submission, Nov. 2019, 1-16.

Verma, Lochan, et al., "Gain Analysis of Coordinated AP Time/Frequency Sharing in a Transmit Opportunity in 11be", doc.: IEEE 802.11-19/1879r0, Submission, Nov. 2019, 1-7.

* cited by examiner

CONTROL OF UPLINK WIRELESS TRANSMISSIONS IN SHARED TXOP

TECHNICAL FIELD

The present invention relates to methods for controlling wireless transmissions and to corresponding devices, systems, and computer programs.

BACKGROUND

In wireless communication technologies, there is an increased interest in using unlicensed bands, like the 2.4 GHz ISM band, the 5 GHz band, the 6 GHz band, and the 60 GHz band using more advanced channel access technologies. Historically, Wi-Fi has been the dominant standard in unlicensed bands when it comes to applications requiring support for high data rates. Due to the large available bandwidth and effectively no competing technology in the unlicensed band, the WLAN (Wireless Local Area Network) technology based on the IEEE 802.11 family standards provides a very simple distributed channel access mechanism based on the so-called distributed coordination function (DCF).

Distributed channel access means that a device, in IEEE 802.11 terminology known as a station (STA), tries to access the channel when it has something to send. Effectively there is no difference in channel access whether the station is an access point or a non-access point. DCF works well as long as the load is not too high. When the load is high, and in particular when the number of stations trying to access the channel is large, channel access based on DCF does not work well. The reason for this is that there will be a high probability of collision on the channel, leading to poor channel usage, and that some STAs will experience the channel to be busy most of the time and very seldom obtain channel access.

To improve the channel usage, and in particular to allow for better support of a large number of devices, a more centralized channel access may be utilized. Such centralized channel access may involve that rather than letting a station access the channel whenever it has data to send, the channel access is controlled by the AP. By way of example. the IEEE 802.11ax technology supports orthogonal frequency division multiple access (OFDMA) in both downlink (DL), i.e., in a direction from the AP to the station, and uplink (UL), i.e., in a direction from the station to the AP. Another example of AP controlled channel access is through multi-user transmission in form of multi-user multiple input multiple output (MU-MIMO) is supported for both the DL and the UL. By supporting MU transmission and letting the AP control the channel access, efficient channel usage is achieved and one can avoid collisions due to contention within a cell, in the IEEE 802.11 terminology also referred to as basic service set (BSS).

Another useful feature in the WLAN technology according to the IEEE 802.11 family standards is a so-called transmission opportunity (TXOP). A device, e.g., the AP, may once it has gained access to the channel reserve the channel for a specific time during which a number of transmissions in alternating directions can take place without the need of contending for the channel at each time. This time is denoted as TXOP. The use of TXOP does not only improve the spectrum usage, but it allows devices not associated to the AP to enter a low power mode and save power. The maximum duration of a TXOP is typically in the order of 5 ms.

To improve the performance even further, coordination of channel usage between cells may be utilized. For example, if there are two or more APs within range using the same channel, with no coordination each of them would contend for the channel and the AP that wins the contention would then reserve the channel using the TXOP feature. The other APs would have to defer from channel access and wait for the TXOP to end. Then a new contention begins and channel access may or may not be gained for a specific AP. This implies that channel access becomes rather unpredictable and support for demanding QoS (Quality of Service) applications may be challenging. Such issues may be avoided by coordinated sharing of the TXOP by multiple APs.

For example, "Coordinated AP Time/Frequency Sharing in a Transmit Opportunity in 11be", Internet document IEEE 802.11-19/1582r1 (URL: "https://mentor.ieee.org/802.11/dcn/19/11-19-1582-01-00be-coordinated-ap-time-and-frequency-sharing-in-a-transmit-opportunity-in-11be.pptx", November 2019) proposes a time/frequency resource sharing mechanism for an enhancement of the WLAN technology referred to as EHT (Extremely High Throughput). In this mechanism multiple APs belonging to the same Extended Service Set (ESS) can coordinate and share among themselves their time/frequency resources within a TXOP. The mechanism utilizes three phases: A first phase involving transmission of a TX indication frame and a request frame. In the first phase an AP that has gained a TXOP, also denoted as the TXOP owner, indicates to other APs that it is willing to share the TXOP (by means of the TX indication frame), and one or more neighboring APs indicate their intention to participate in sharing the resources (by the request frame). The first phase may also be referred to as initial coordination phase. In a second phase the TXOP owner informs the participating APs about their allocated resources and a TX start time, and the participating APs inform their client STAs about their respective resource allocations. In a third phase the participating APs transmit on their respective allocated resources in the TXOP, beginning at the TX start time. FIG. 1 illustrates an example of a corresponding procedure, assuming TDMA (Time Division Multiple Access) coordination for transmission DL data. The example of FIG. 1 involves two APs, denoted as AP1 and AP2, and two stations, denoted as STA11 and STA21. AP1 is assumed to be the TXOP owner, STA11 is a station attached to AP1, AP2 is a participating AP requesting to participate in the TXOP sharing, and STA21 is a station attached to AP2. In the example of FIG. 1, AP1 sends a first DL data transmission to STA11. The DL data transmission is triggered by a TF sent by AP1. STA11 acknowledges successful reception of the first DL data transmission by sending an ACK (acknowledgement) frame. In the same TXOP, AP2 sends a second DL data transmission to STA21. STA21 acknowledges successful reception of the second DL data transmission by sending an ACK frame.

It is noted that a similar coordination as explained in connection with FIG. 1 may also be utilized in the frequency domain, using OFDMA. In this case, the participating APs are allocated non-overlapping bandwidth parts. "Gain Analysis of Coordinated AP Time/Frequency Sharing in a Transmit Opportunity in 11be", Internet document IEEE 802.11-19/1879r1 (URL:
"https://mentor.ieee.org/802.11/dcn/19/11-19-1879-00-00be-coordinated-ap-time-and-frequency-sharing-gain-analysis.pptx", November 2019) shows the benefits of this coordination method by means of simulations).

A further feature of the IEEE 802.11ax technology is utilization of two NAVs (Network Allocation Vectors), see IEEE P802.11ax™/D6.0 Draft Standard for Information technology—Tele-communications and information exchange between systems Local and metropolitan area networks—Specific requirements Part 11: Wireless LAN Medium Access Control (MAC) and Physical Layer (PHY) Specifications Amendment 1: Enhancements for High Efficiency WLAN (November 2019). A Network Allocation Vector (NAV) is a logical MAC (Medium Access Control) function for enabling virtual carrier sensing. The virtual carrier sensing utilizes a Duration field included in most MAC frames. The Duration field holds a time value indicating the time interval during which the sending station expects the medium to be busy. This value is used to set or update the NAV in stations which are not the destination of the frame. The NAV may be implemented as a counter which counts down to zero at a constant rate. The NAV thus operates as a timer which is set to a value indicated by the Duration field in the received MAC frame. When the counter is zero the virtual carrier sensing indicates that the wireless medium is idle, otherwise it indicates that the wireless medium is busy. The 802.11ax technology provides an enhanced MAC mechanism to better support multi-user environments, as for example explained in Section 26.2.4 of the IEEE P802.11ax/D6.0 draft. In this enhanced MAC mechanism, a non-AP High Efficiency (HE) Station (STA) shall maintain two NAVs and an HE Access Point (AP) may maintain two NAVs: an intra-BSS NAV and a basic NAV. The intra-BSS NAV is updated by an intra-BSS PPDU (Physical Layer Protocol Data Unit). The basic NAV is updated by an inter-BSS PPDU or a PPDU that cannot be classified as intra-BSS or inter-BSS. A STA does not consider the medium idle if at least one of the two NAV timers is not zero. Furthermore, according to Section 26.5.2.5 of the IEEE P802.11ax/D6.0 draft, the intra-BSS NAV can be ignored in the virtual carrier sensing by a non-AP STA when determining whether to respond to a Trigger Frame (TF) sent by the AP with which the non-AP STA is associated.

The above-mentioned coordinated AP sharing method underlying the example of FIG. 1 is however limited to data transmission from the AP to the STAs, i.e., to transmission of DL data. It is desirable to extend the TXOP sharing mechanism also to UL transmissions. However, the virtual carrier sensing of the IEEE 802.11 standards family, using either one or two NAVs, supports this method of TXOP sharing. To illustrate the problem, a scenario as illustrated in FIG. 2 may be considered. The scenario of FIG. 2 assumes a situation similar to that of FIG. 1, but assuming that the APs schedule the STAs to send UL data. Again, AP1 is the TXOP owner, STA 11 is associated to AP1, AP2 is a participating AP, STA21 is associated to AP2. AP3 is assumed to be a non-participating AP and included only to illustrate some details of the problem.

FIG. 3 shows an example of a frame exchange based on the three phases similar to FIG. 1, but targeting UL transmission in the scenario of FIG. 2. As can be seen, STA21 is in this case not able to transmit UL data because the transmission the TX indication (TX Ind) by AP1 sets the basic NAV of STA21. According to the dual NAV rules in the IEEE P802.11ax/D6.0 draft, the TF from AP2 can't override the basic NAV of STA21. According to these rules, STA21 treats AP1 and AP3 in the same way. If AP3 had been the owner of the TXOP, it would have been a desirable behavior for STA21 to remain silent as indicated by the basic NAV.

Accordingly, there is a need for techniques which allow for efficiently controlling sharing of a TXOP for UL wireless transmissions.

SUMMARY

According to an embodiment, a method of controlling wireless transmissions in a wireless communication system is provided. According to the method, a wireless device configures a carrier for communication with a serving access point. The wireless device maintains a virtual carrier sense timer. The virtual carrier sense timer indicates that the carrier is to be regarded as occupied as long as the virtual carrier sense timer is not expired. The wireless device receives one or more wireless transmissions on the carrier. The one or more wireless transmissions each include: an identifier commonly assigned to multiple access points which cooperate by sharing a transmission opportunity, and a duration field for indicating a duration for which the carrier is expected to be occupied. In response to the identifier matching an identifier of the serving access point, the wireless device updates the virtual carrier sense timer according to the indicated duration. Based on the virtual carrier sense timer, the wireless device controls one or more UL wireless transmissions from the wireless device.

According to a further embodiment, a method of controlling wireless transmissions in a wireless communication system is provided. According to the method, an access point configures a carrier for communication with one or more wireless devices. Further, the access point sends one or more wireless transmissions on the carrier. The one or more wireless transmissions each include: an identifier commonly assigned to the access point and one or more other access points which cooperate with the access point by sharing a transmission opportunity, and a duration field for indicating a duration for which the carrier is expected to be occupied. Upon reception of one of the one or more wireless transmissions by a wireless device the identifier matching an identifier of a serving access point of the wireless device causes the wireless device to update a virtual carrier sense timer according to the indicated duration and to control one or more uplink wireless transmissions from the wireless device based on the virtual carrier sense timer.

According to a further embodiment, a wireless device for a wireless communication system is provided. The wireless device is configured to configure a carrier for communication with a serving access point. Further, the wireless device is configured to maintain a virtual carrier sense timer indicating that the carrier is to be regarded as occupied as long as the virtual carrier sense timer is not expired. Further, the wireless device is configured to receive one or more wireless transmissions on the carrier. The one or more wireless transmissions each include an identifier commonly assigned to multiple access points which cooperate by sharing a transmission opportunity, and a duration field for indicating a duration for which the carrier is expected to be occupied. Further, the wireless device is configured to, in response to the identifier matching an identifier of the serving access point, update the virtual carrier sense timer according to the indicated duration. Further, the wireless device is configured to, based on the virtual carrier sense timer, control one or more uplink wireless transmissions from the wireless device.

According to a further embodiment, a wireless device for a wireless communication system is provided. The wireless device comprises at least one processor and a memory. The memory contains instructions executable by said at least one processor, whereby the wireless device is operative to configure a carrier for communication with a serving access point. Further, the memory contains instructions executable by said at least one processor, whereby the wireless device is operative to maintain a virtual carrier sense timer indicating that the carrier is to be regarded as occupied as long as the virtual carrier sense timer is not expired. Further, memory contains instructions executable by said at least one processor, whereby the wireless device is operative to receive one or more wireless transmissions on the carrier. The one or more wireless transmissions each include an identifier commonly assigned to multiple access points which cooperate by sharing a transmission opportunity, and a duration field for indicating a duration for which the carrier is expected to be occupied. Further, memory contains instructions executable by said at least one processor, whereby the wireless device is operative to, in response to the identifier matching an identifier of the serving access point, update the virtual carrier sense timer according to the indicated duration. Further, memory contains instructions executable by said at least one processor, whereby the wireless device is operative to, based on the virtual carrier sense timer, control one or more uplink wireless transmissions from the wireless device.

According to a further embodiment, an access point for a wireless communication system is provided. The access point is configured to configure a carrier for communication with one or more wireless devices. Further, the access point is configured to send one or more wireless transmissions on the carrier. The one or more wireless transmissions each include: an identifier commonly assigned to the access point and one or more other access points which cooperate with the access point by sharing a transmission opportunity, and a duration field for indicating a duration for which the carrier is expected to be occupied. Upon reception of one of the one or more wireless transmissions by a wireless device the identifier matching an identifier of a serving access point of the wireless device causes the wireless device to update a virtual carrier sense timer according to the indicated duration and to control one or more uplink wireless transmissions from the wireless device based on the virtual carrier sense timer.

According to a further embodiment, an access point for a wireless communication system is provided. The access point comprises at least one processor and a memory. The memory contains instructions executable by said at least one processor, whereby the access point is operative to configure a carrier for communication with one or more wireless devices. Further, memory contains instructions executable by said at least one processor, whereby the access point is operative to send one or more wireless transmissions on the carrier. The one or more wireless transmissions each include: an identifier commonly assigned to the access point and one or more other access points which cooperate with the access point by sharing a transmission opportunity, and a duration field for indicating a duration for which the carrier is expected to be occupied. Upon reception of one of the one or more wireless transmissions by a wireless device the identifier matching an identifier of a serving access point of the wireless device causes the wireless device to update a virtual carrier sense timer according to the indicated duration and to control one or more uplink wireless transmissions from the wireless device based on the virtual carrier sense timer.

According to a further embodiment of the invention, a computer program or computer program product is provided, e.g., in the form of a non-transitory storage medium, which comprises program code to be executed by at least one processor of a wireless device for a wireless communication system. Execution of the program code causes the wireless device to configure a carrier for communication with a serving access point. Further, execution of the program code causes the wireless device to maintain a virtual carrier sense timer indicating that the carrier is to be regarded as occupied as long as the virtual carrier sense timer is not expired. Further, execution of the program code causes the wireless device to receive one or more wireless transmissions on the carrier. The one or more wireless transmissions each include an identifier commonly assigned to multiple access points which cooperate by sharing a transmission opportunity, and a duration field for indicating a duration for which the carrier is expected to be occupied. Further, execution of the program code causes the wireless device to, in response to the identifier matching an identifier of the serving access point, update the virtual carrier sense timer according to the indicated duration. Further, the wireless device is configured to, based on the virtual carrier sense timer, control one or more uplink wireless transmissions from the wireless device.

According to a further embodiment of the invention, a computer program or computer program product is provided, e.g., in the form of a non-transitory storage medium, which comprises program code to be executed by at least one processor of an access point for a wireless communication system. Execution of the program code causes the access point to configure a carrier for communication with one or more wireless devices. Further, execution of the program code causes the access point to send one or more wireless transmissions on the carrier. The one or more wireless transmissions each include: an identifier commonly assigned to the access point and one or more other access points which cooperate with the access point by sharing a transmission opportunity, and a duration field for indicating a duration for which the carrier is expected to be occupied. Upon reception of one of the one or more wireless transmissions by a wireless device the identifier matching an identifier of a serving access point of the wireless device causes the wireless device to update a virtual carrier sense timer according to the indicated duration and to control one or more uplink wireless transmissions from the wireless device based on the virtual carrier sense timer.

Details of such embodiments and further embodiments will be apparent from the following detailed description of embodiments.

DETAILED DESCRIPTION OF EMBODIMENTS

In the following, concepts in accordance with exemplary embodiments of the invention will be explained in more detail and with reference to the accompanying drawings. The illustrated embodiments relate to controlling of wireless transmissions in a wireless communication system. The wireless communication system may be a WLAN (Wireless Local Area Network) system based on a IEEE 802.11 technology. However, it is noted that the illustrated concepts could also be applied to other wireless communication technologies, e.g., to contention-based modes of the LTE (Long Term Evolution) or NR (New Radio) technology specified by 3GPP ($3^{rd}$ Generation Partnership Project).

The illustrated concepts are based on utilizing an identifier commonly assigned to APs participating in TXOP sharing. In response to a station receiving a frame with the commonly assigned identifier and the commonly assigned identifier matching an identifier of a serving AP of the station, the station updates a virtual carrier sense timer, such as an intra-BSS NAV. Based on these concepts, a dual NAV mechanism as for example provided in the IEEE 802.11ax technology may be enhanced to enable TXOP sharing for UL data transmission. This may in particular involve that APs participating in the TXOP sharing include their common SSID in the transmitted frames. A station may then update its intra-BSS NAV if a received frame originates in a participating AP and contains the SSID of its AP. Further, a station may ignore its intra-BSS NAV in response to a trigger frame (TF) transmitted by the BSS to which it is associated. Accordingly, if an AP participating in the TXOP sharing transmits a TF for triggering a UL transmission in the TXOP, this will result in updating the intra-BSS NAV in a station served by another AP participating in the TXOP sharing, rather than the inter-BSS NAV. As a consequence, the station can still utilize the TXOP for another UL transmission, e.g., by ignoring its intra-BSS NAV in response to a TF transmitted by the BSS to which it is associated. The illustrated concepts may thus be used to enable coordinated TXOP sharing in UL and thereby achieve improvements in terms of worst-case latency and throughput fairness also for UL transmissions.

Figure 4:
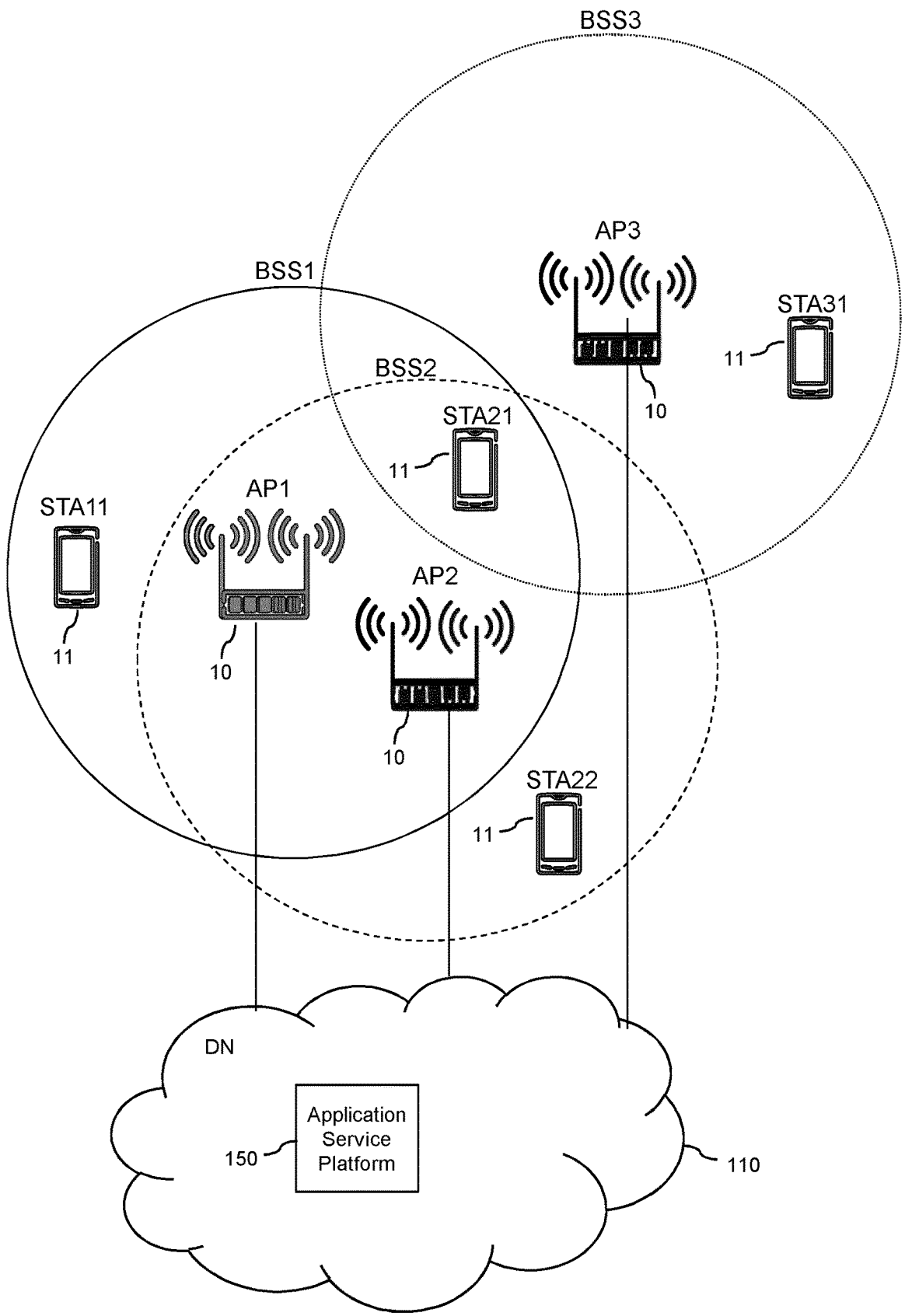
FIG. 4 schematically illustrates a wireless communication system according to an embodiment.

FIG. 4 illustrates an exemplary wireless communication system according to an embodiment. In the illustrated example, the wireless communication system includes multiple APs 10, in the illustrated example referred to as AP1, AP2, and AP3, and multiple stations (STAs) 11, in the illustrated example referred to as STA11, STA21, STA22, and STA31. The station STA11 is served by AP1 (in a first BSS denoted as BSS1), the stations STA21 and STA22 are served by AP2 (in a second BSS denoted as BSS2). The station STA31 is served by AP3 (in a third BSS denoted as BSS3). The stations 11 may correspond to various kinds of wireless devices, for example user terminals, such as mobile or stationary computing devices like smartphones, laptop computers, desktop computers, tablet computers, gaming devices, or the like. Further, the stations 11 could for example correspond to other kinds of equipment like smart home devices, printers, multimedia devices, data storage devices, or the like.

In the example of FIG. 4, each of the stations 11 may connect through a radio link to one of the APs 10. For example depending on location or channel conditions experienced by a given station 11, the station 11 may select an appropriate AP 10 and BSS for establishing the radio link. The radio link may be based on one or more OFDM carriers from a frequency spectrum which is shared on the basis of a contention based mechanism, e.g., an unlicensed band like the 2.4 GHz ISM band, the 5 GHz band, the 6 GHz band, or the 60 GHz band.

Each AP 10 may provide data connectivity of the stations 11 connected to the AP 10. As further illustrated, the APs 10 may be connected to a data network (DN) 110. In this way, the APs 10 may also provide data connectivity of stations 11 connected to different APs 10. Further, the APs 10 may also provide data connectivity of the stations 11 to other entities, e.g., to one or more servers, service providers, data sources, data sinks, user terminals, or the like.

Figure 1:
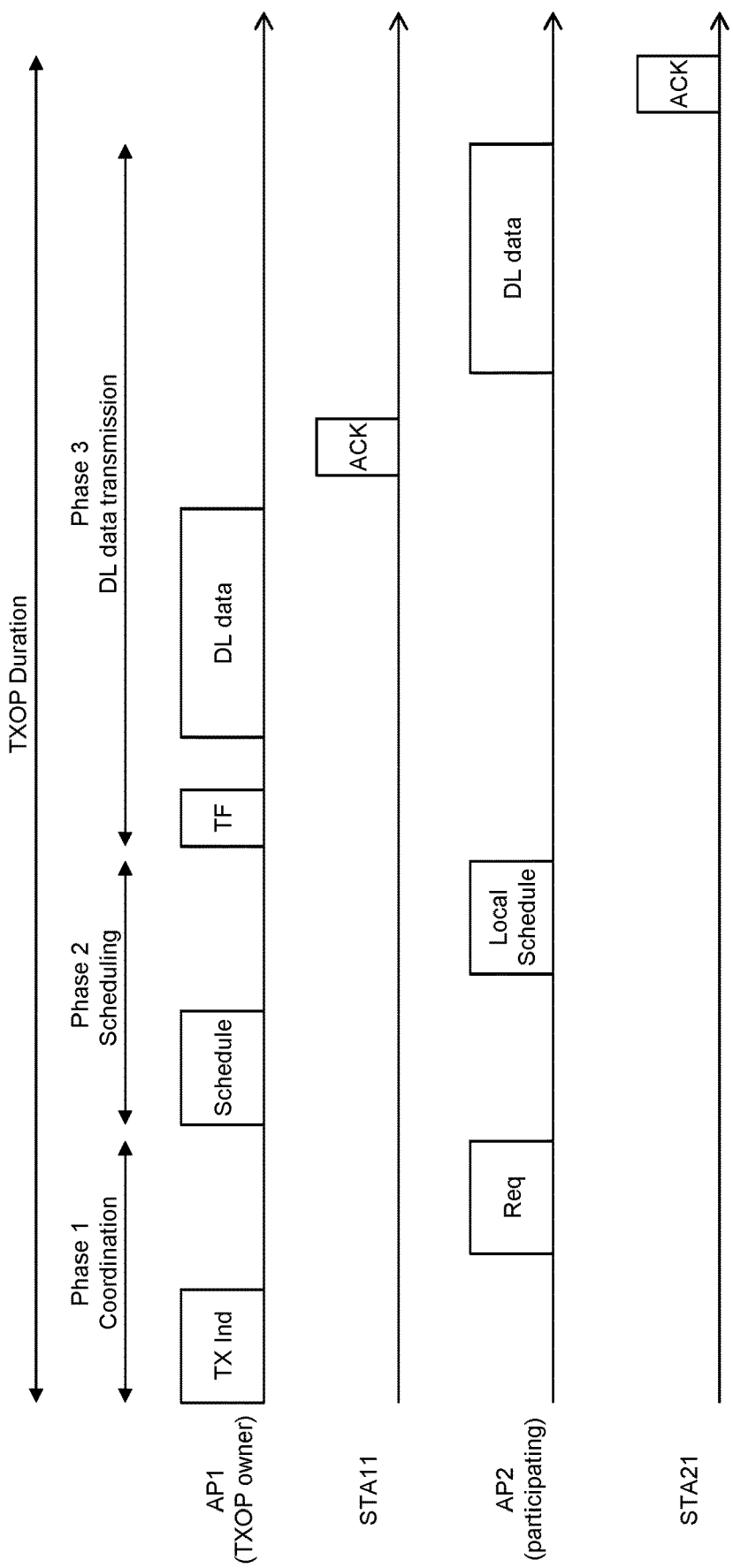
FIG. 1 schematically illustrates an example of a scenario involving sharing of a TXOP for DL data transmission.
Figure 2:
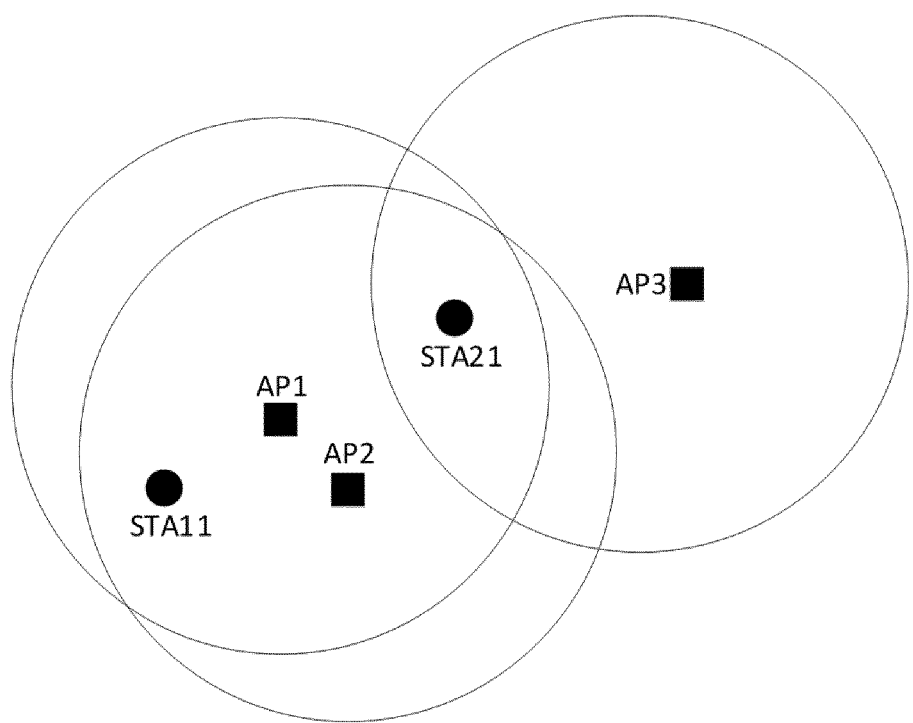
FIGS. 2 and 3 schematically illustrate an example of a scenario for illustrating problems that may occur when sharing a TXOP for UL data transmission.
Figure 3:
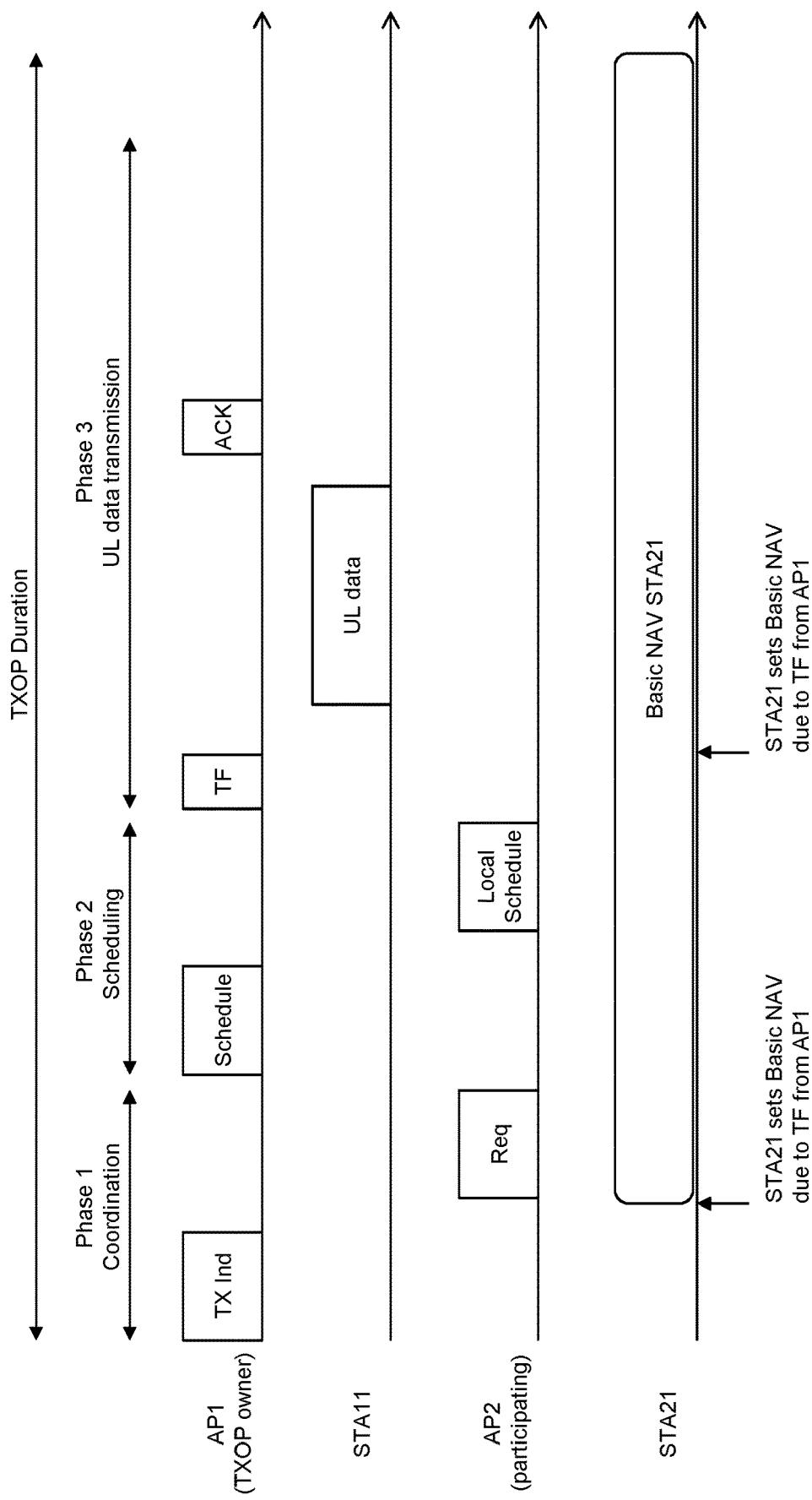

Accordingly, the radio link established between a given station 11 and its serving AP 10 may be used for providing various kinds of services to the station 11, e.g., a voice service, a multimedia service, or other data service. Such services may be based on applications which are executed on the station 11 and/or on a device linked to the station 11. By way of example, FIG. 1 illustrates an application service platform 150 provided in the DN 110. The application(s) executed on the station 11 and/or on one or more other devices linked to the station 11 may use the radio link for data communication with one or more other stations 11 and/or the application service platform 150, thereby enabling utilization of the corresponding service(s) at the station 11.

To achieve high performance in a scenario like illustrated in FIG. 4, coordination between the cells or BSSs may be utilized. In the illustrated examples, the involved APs 10 are assumed to contend for and share common resources. In particular, two or more of the APs 10 may contend for the same carrier in order to obtain a TXOP. Then, the winning AP 10 can share the resources with the other contending APs in a dynamic fashion. For example, it can share the resources differently in different TXOPs. Further, the coordination of transmissions is based on utilizing a dual-timer virtual carrier sense mechanism. In particular, it is assumed that the stations 11 each maintain two NAVs: an intra-BSS NAV and a basic NAV. In a similar manner, also the APs 10 could maintain an intra-BSS NAV and a basic NAV. The NAVs are updated based on a duration field included in a received frame. The intra-BSS NAV is updated by an intra-BSS PPDU. The basic NAV is updated by an inter-BSS PPDU or a PPDU that cannot be classified as intra-BSS or inter-BSS. A station 11 does not consider the carrier as being free (or idle) if at least one of the two NAV timers is not zero. Similar as specified in Section 26.5.2.5 of the IEEE P802.11ax/D6.0 draft, the intra-BSS NAV can be ignored in the virtual carrier sensing by a station 11 when determining whether to respond to a TF sent by the AP 10 to which the station 11 is associated, i.e., by a serving AP 10 of the station.

In the illustrated example, the APs 10 announce their BSSID and SSID in a management frame, e.g., a beacon frame, and a station 11 stores in memory both the BSSID and SSID of the AP 10 to which it is associated. This assumed to occur before a station 11 participates in a TXOP sharing. The frames transmitted by the APs 10 participating in TXOP sharing, in particular a TX indication frame, request frame, schedule frame, local schedule frame, and TF, include an SSID field and a field denoted as "INTRA_BSS_NAV_UPDATE", which indicates that the intra-BSS NAV maintained by the station should be updated.

Upon reception of a PPDU, a station 11 shall update its intra-BSS NAV if one of the following conditions is met:
1) The STA determines that the received PPDU is an intra-BSS PPDU, or
2) The STA determines that the received PPDU contains a frame which comprises the SSID of the AP to which the STA is associated, and the INTRA_BSS_NAV_UPDATE field indicates that the intra-BSS NAV should be updated.

Based on these rules, TXOP sharing can be enabled for UL transmission. This is further illustrated by examples as illustrated in FIGS. 5 and 6.

Figure 5:
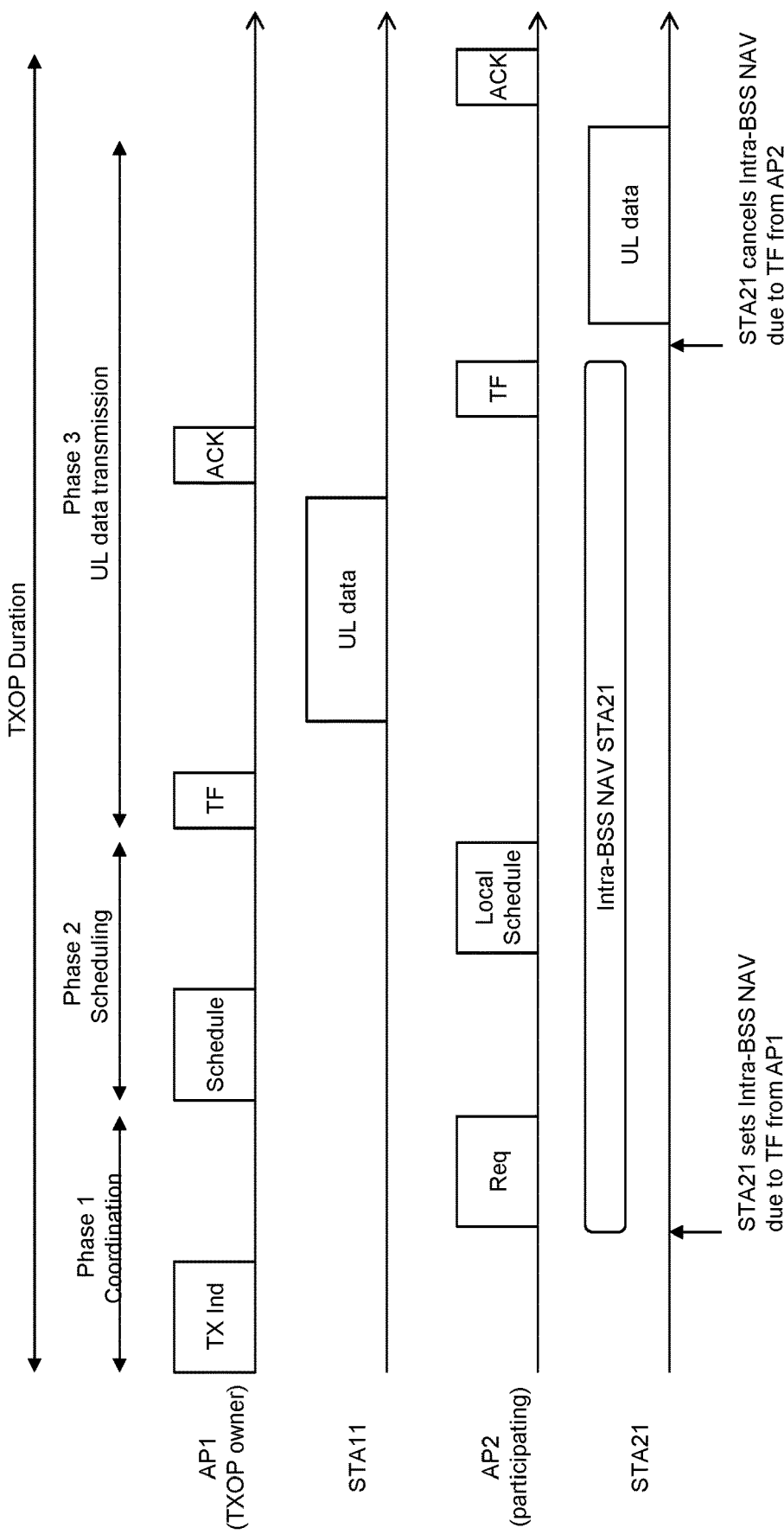
FIG. 5 schematically illustrates an example of a scenario involving sharing of a TXOP for UL data transmission according to an embodiment.
Figure 6:
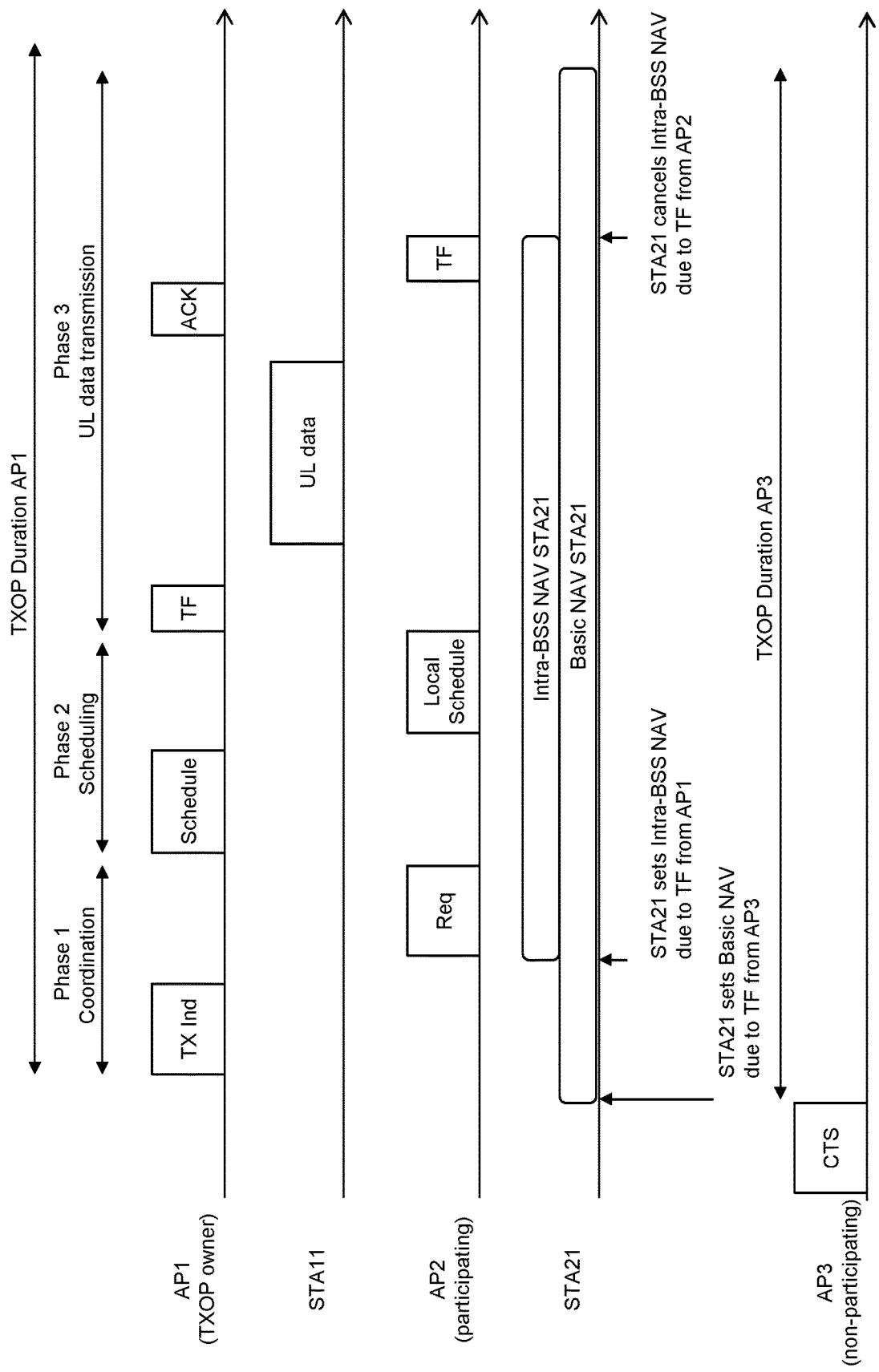
FIG. 6 schematically illustrates a further example of a scenario involving sharing of a TXOP for UL data transmission according to an embodiment.

FIG. 5 further illustrates an exemplary scenario in which APs 10 share a TXOP for UL data transmission. The example of FIG. 5 assumes a situation as illustrated in FIG. 4 and involves two APs, denoted as AP1, AP2, which may for example correspond to the AP1 and AP2 of FIG. 4. Further, the scenario of FIG. 4 involves a station served by AP1, denoted as STA11, and a station served by AP2, denoted by STA21. These stations may for example correspond to the stations STA11 and STA21 of FIG. 4. AP1 and AP2 cooperate by sharing a TXOP. AP1 is assumed to be the owner of the TXOP. For example, AP1 and AP2 may have contended for the carrier, with AP1 winning the contention. In other words, the scenario underlying the example of FIG. 5 may be similar to that of FIG. 4, with AP3 remaining silent during the illustrated procedure.

In the example of FIG. 5, in a first phase after winning contention for the carrier, AP1 transmits a TX indication (TX Ind) frame. By means of the TX indication frame, the TXOP owner, i.e., AP1, indicates to other APs that it is willing to share the TXOP. Further, the TX indication fame may also indicate the SSID assigned to the APs participating in the TXOP sharing.

In the illustrated example, AP2 decides to participate in the sharing of the TXOP and thus responds by sending a request (Req) frame. The first phase may also be referred to as initial coordination phase. In a second phase the TXOP owner, i.e., AP1, informs the participating AP, i.e., AP2, and the stations associated to AP, i.e., STA11, about their allocated resources and a TX start time. This is accomplished by sending a schedule frame (Schedule). Further, the second phase involves that the participating APs, i.e., AP2, inform their associated stations about their respective resource allocations. This is accomplished by sending a local schedule frame (Local Schedule). Subsequently, the stations associated to the APs participating in the TXOP sharing may perform UL transmissions. In the example of FIG. 5, this involves that AP1 sends a TF to trigger a first UL data transmission by STA11. AP1 acknowledges successful reception of the first UL data transmission by sending an ACK frame. Similarly, AP acknowledges successful reception of the second UL data transmission by sending an ACK frame.

In the example of FIG. 5, STA21 sets its intra-BSS NAV due to the TX indication frame transmitted by AP1, because the TX indication frame includes the SSID commonly assigned to the APs participating in the TXOP sharing. Upon reception of the TF from its serving AP, i.e., from AP2, STA21 however decides to cancel its intra-BSS NAV, so that STA21 can proceed to perform the UL data transmission. This decision may for example be based on rules indicated in the local schedule frame.

The example of FIG. 6 is similar to that of FIG. 5. In the example of FIG. 6 it is however assumed that AP3 is not silent and has gained access to the carrier already before AP1. In the example of FIG. 6, this results in AP3 sending a CTS (Clear To Send) frame. The CTS frame includes the SSID of AP3, which is however different from the SSID to AP1 and AP2. Accordingly, upon receiving the CTS frame, the STA21 sets its inter-BSS NAV in accordance with the duration field included in the CTS frame, with the effect that STA21 remains silent for the TXOP of AP3. Accordingly, interference of an UL data transmission by STA21 with DL or UL transmissions in BSS3 can be avoided. Here, it is to be noted that due to the coverage areas of BSS1, BSS2, and BSS3 as illustrated in FIGS. 4, AP1 and AP2 cannot receive the CTS frame from AP3, so that AP1 and AP2 can contend for the carrier in the same way as if AP3 were silent, like in the example of FIG. 5. Further, since STA11 is outside the range of AP3, the UL data transmission by STA11 has no risk of interfering with DL or UL transmissions in BSS3.

As can be seen from the examples of FIGS. 5 and 6, the commonly assigned SSID enables a station to recognize that a received frame relates to a BSS which is involved in TXOP sharing with the serving AP of the station and to trigger updating of a corresponding virtual carrier sense timer, namely the intra-BSS NAV. Triggering updating of another virtual carrier sense timer which imposes more severe restrictions on the station, such as the basic NAV, can thus be avoided.

Figure 7:
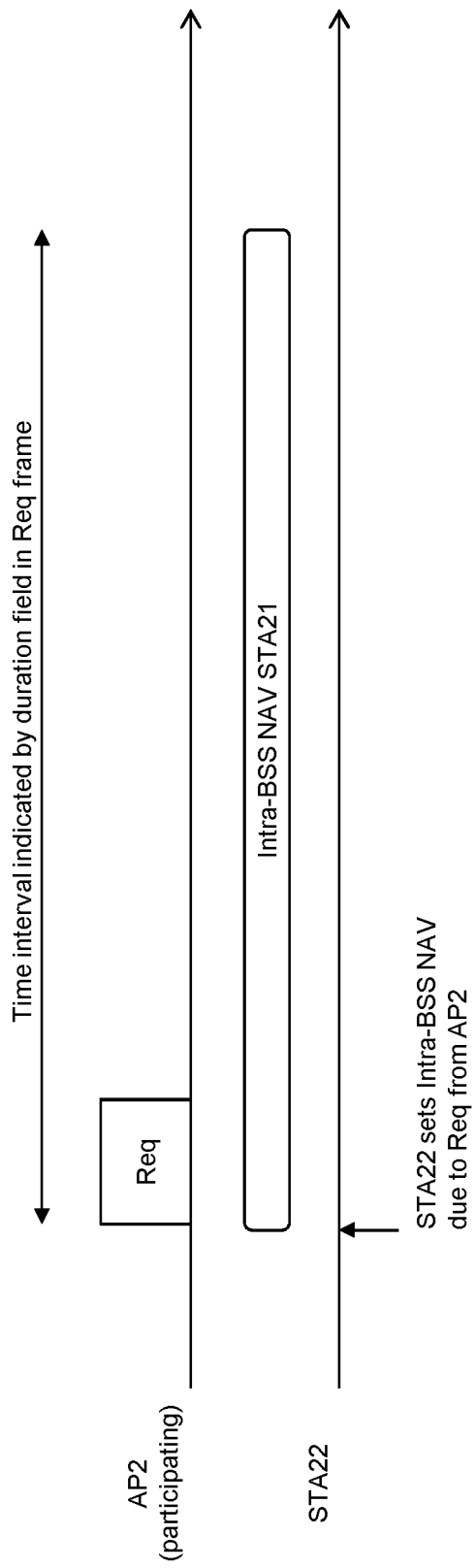
FIG. 7 schematically illustrates an example for illustrating utilization of a duration field in a message for coordinating sharing of a TXOP according to an embodiment.

In the illustrated TXOP sharing mechanism, an AP transmitting a request frame in response to a TX indication frame from the TXOP owner, e.g., like AP2 in the examples of FIGS. 5 and 6, may set the duration field in the request frame in such a way that it protects at least the subsequent local schedule frame, and preferably the whole remaining duration of the shared TXOP. A corresponding example is illustrated in FIG. 7. Setting the duration field in this way may help to prevent non-scheduled access to the carrier by stations associated to the AP sending the request frame. For example, a station that is outside the range of the TXOP owner, such as STA22 in the scenario of FIG. 4, could attempt a random UL transmission that collides with the local schedule frame. If the AP sending the request frame is not granted access to the carrier, then it would not transmit a local schedule frame. Nonetheless it is still beneficial to prevent its associated stations to access the carrier since the AP is not allowed to send ACKs during the duration of the TXOP.

Figure 8:
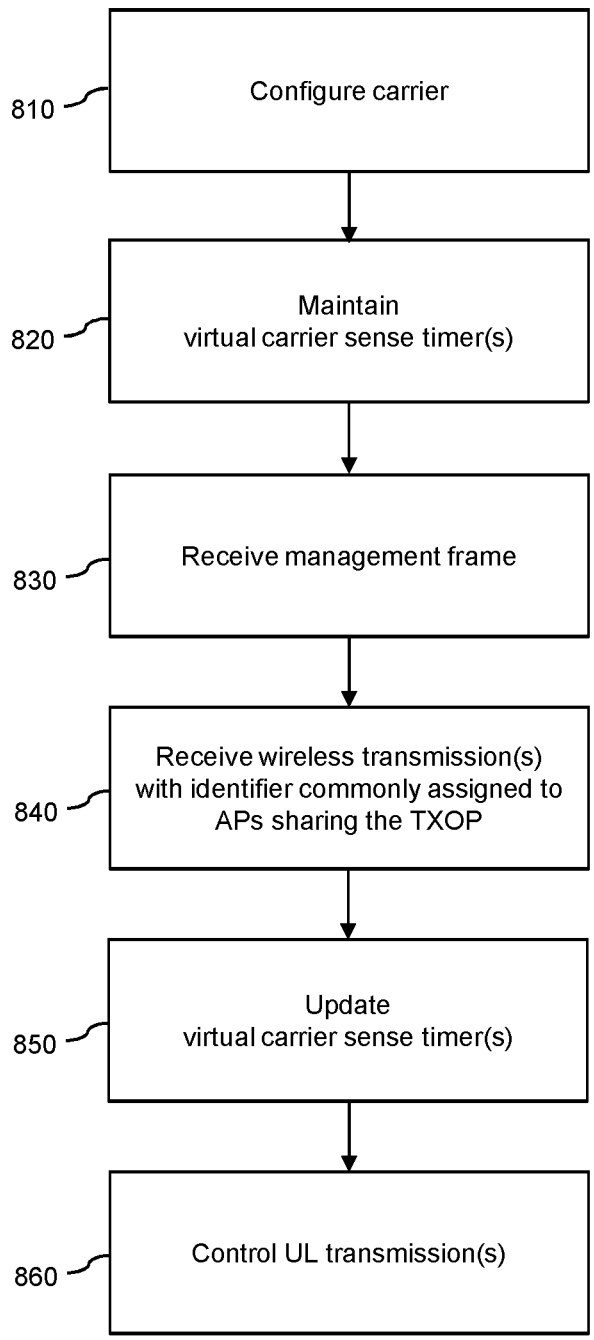
FIG. 8 shows a flowchart for schematically illustrating a method according to an embodiment.

FIG. 8 shows a flowchart for illustrating a method, which may be utilized for implementing the illustrated concepts. The method of FIG. 8 may be used for implementing the illustrated concepts in a wireless device for operation in a wireless communication system. The wireless communication system may be based on a wireless local area network, WLAN, technology, e.g., according to the IEEE 802.11 standards family. The wireless device may for example correspond to any of the above-mentioned stations 11, in particular to STA21 in the examples explained in connection with of FIGS. 5 and 6.

If a processor-based implementation of the wireless device is used, at least some of the steps of the method of FIG. 8 may be performed and/or controlled by one or more processors of the wireless device. Such wireless device may also include a memory storing program code for implementing at least some of the below described functionalities or steps of the method of FIG. 8.

At step 810, the wireless device configuring a carrier for communication with a serving access point. This may for example involve selecting the carrier from a set of available carriers and/or determining one or more transmission parameters to be used of UL and/or DL transmissions on the carrier. The serving access point may be responsible for controlling or otherwise coordinating UL wireless transmissions from the wireless device and/or DL wireless transmissions to the wireless device. For example, the serving access point may responsible for triggering such wireless transmissions and/or for allocating resources of the carrier to be used for such wireless transmissions. The carrier may be used in a TDD mode and/or in an FDD mode.

At step 820, the wireless device maintains a virtual carrier sense timer. The virtual carrier sense timer indicates that the carrier is to be regarded as occupied as long as the virtual carrier sense timer is not expired. The virtual carrier sense timer may for example be implemented on the basis of a counter. In some scenarios, the virtual carrier sense timer may correspond to an intra-BSS NAV.

In some scenarios, step 820 may further involve that the wireless device additionally maintains a further virtual carrier sense timer indicating that the carrier is to be regarded as occupied as long as the further virtual carrier sense timer is not expired. The further virtual carrier sense timer can for example correspond to a Basic NAV.

At step 830, the wireless device may receive a management frame from the serving access point. The management frame may indicate the commonly assigned identifier. The management frame may include a message for coordinating the sharing of the TXOP, such as the above-mentioned TX indication frame transmitted by AP1.

At step 840, the wireless device receives one or more wireless transmissions on the carrier. The one or more wireless transmissions each include an identifier commonly assigned to multiple access points which cooperate by sharing a TXOP. The commonly assigned identifier may be an SSI D. Further, the one or more wireless transmissions each include a duration field for indicating a duration for which the carrier is expected to be occupied. The one or more wireless transmissions may include a message for coordinating the sharing of the TXOP, such as the above-mentioned request frame transmitted by AP2.

In some scenarios, the one or more wireless transmissions may each further include an update indication for controlling updating of the virtual carrier sense timer, such as the above-mentioned INTRA_BSS_NAV_UPDATE field.

At step 850, the wireless device updates the virtual carrier sense timer. In particular, in response to the identifier matching an identifier of the serving AP, the wireless device updates the virtual carrier sense timer according to the indicated duration. If the one or more wireless transmission further includes an update indication for controlling updating of the virtual carrier sense timer, such as the above-mentioned INTRA_BSS_NAV_UPDATE field, updating of the virtual carrier sense timer may further be based on the update indication. For example, the wireless device may update the virtual carrier sense timer in response to the update indication being present in the received wireless transmission.

If the wireless device also maintains the above-mentioned further virtual carrier sense timer, step 850 may further involve that in response to the identifier not matching an identifier of the serving AP, the wireless device updates the further virtual carrier sense timer according to the indicated duration.

At step 860, the wireless device controls one or more UL wireless transmissions from the wireless device based on the virtual carrier sense timer. This may for example involve deferring from such UL wireless transmissions while the virtual carrier sense timer is not expired. The UL wireless transmissions may be UL wireless transmissions from the wireless device to the serving access point. Additionally or alternatively, the UL wireless transmissions could also be directed to other APs, e.g., when utilizing a multi-AP connectivity configuration of the wireless device.

In some scenarios, step 860 may involve that the wireless device receives a further wireless transmission from the serving AP, with the further wireless transmission comprising a TF for scheduling a UL wireless transmission by the wireless device. In this case, in response to the TF, the wireless device may perform the UL wireless transmission irrespective of expiry of the virtual carrier sense timer.

If the wireless device also maintains the above-mentioned further virtual carrier sense timer, step 860 may further involve that the wireless device controls the one or more UL wireless transmissions also based on the virtual carrier sense timer. This may for example involve deferring from such UL wireless transmissions while the virtual carrier sense timer are both not expired.

Figure 9:
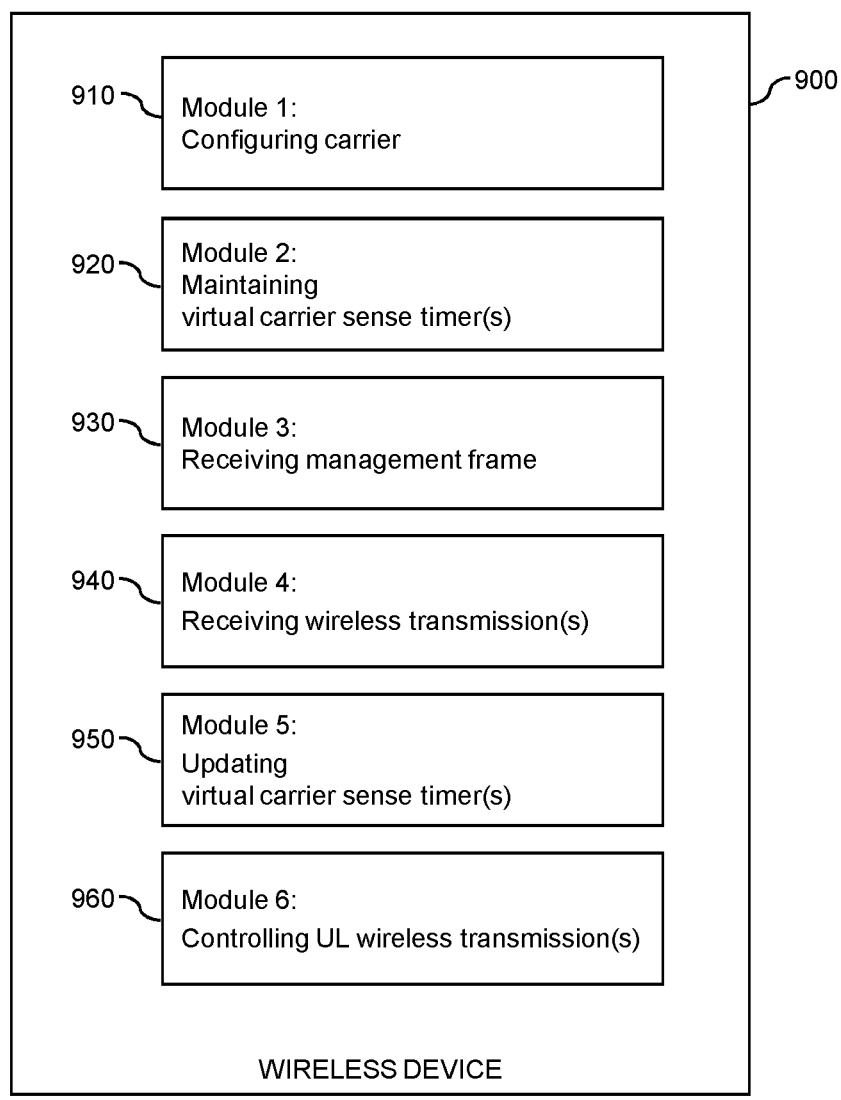
FIG. 9 shows a block diagram for schematically illustrating functionalities of a wireless device according to an embodiment.

FIG. 9 shows a block diagram for illustrating functionalities of an wireless device 900 which operates according to the method of FIG. 8. The wireless device 900 may for example correspond to one of above-mentioned stations 11. As illustrated, the wireless device 900 may be provided with a module 910 configured to configure a carrier for communication with a serving access point, such as explained in connection with step 810. Further, the wireless device 900 may be provided with a module 920 configured to maintain at least one virtual carrier sense timer, such as explained in connection with step 820. Further, the wireless device 900 may optionally be provided with a module 930 configured to receive a management frame, such as explained in connection with step 830. Further, the wireless device 900 may be provided with a module 940 configured to receive one or more wireless transmissions, such as explained in connection with step 840. Further, the wireless device 900 may be provided with a module 950 configured to update the at least one virtual carrier sense timer, such as explained in connection with step 850. Further, the wireless device 900 may be provided with a module 960 configured to control UL wireless transmissions, such as explained in connection with step 860.

It is noted that the wireless device 900 may include further modules for implementing other functionalities, such as known functionalities of a WLAN station. Further, it is noted that the modules of the wireless device 900 do not necessarily represent a hardware structure of the wireless device 900, but may also correspond to functional elements, e.g., implemented by hardware, software, or a combination thereof.

Figure 10:
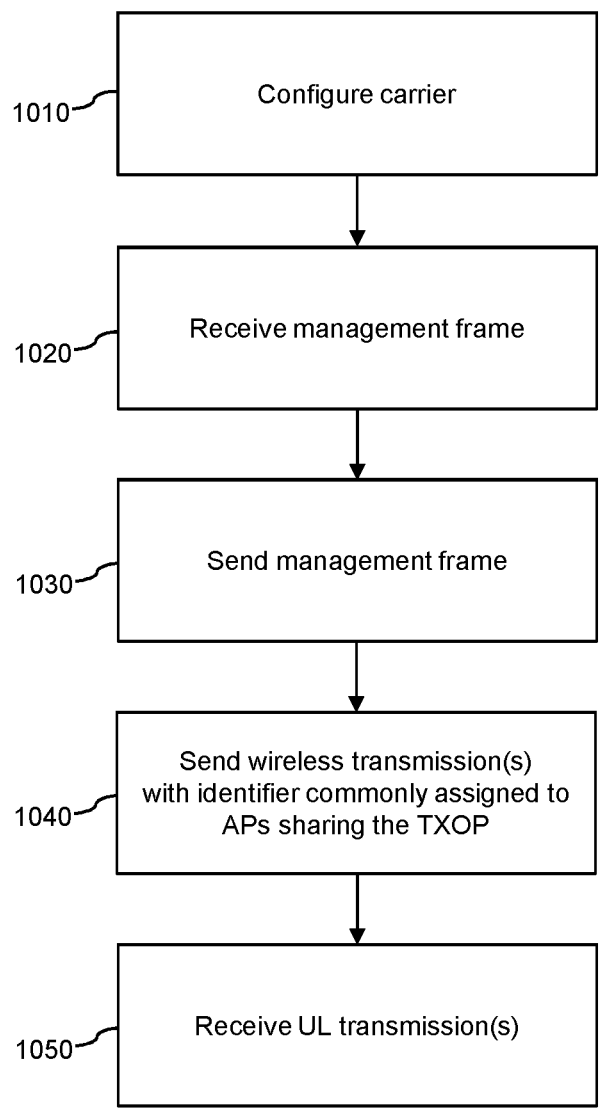
FIG. 10 shows a flowchart for schematically illustrating a further method according to an embodiment.

FIG. 10 shows a flowchart for illustrating a method, which may be utilized for implementing the illustrated concepts. The method of FIG. 10 may be used for implementing the illustrated concepts in a network node, in particular an access point for a wireless communication system. The wireless communication system may be based on a wireless local area network, WLAN, technology, e.g., according to the IEEE 802.11 standards family. The access point may for example correspond to any of the above-mentioned APs 10, in particular to AP1 or AP2 in the examples explained in connection with FIG. 5. and 6.

If a processor-based implementation of the access point is used, at least some of the steps of the method of FIG. 10 may be performed and/or controlled by one or more processors of the access point. Such access point may also include a memory storing program code for implementing at least some of the below described functionalities or steps of the method of FIG. 10.

At step 1010, the access point an access point configures a carrier for communication with one or more wireless devices. This may for example involve selecting the carrier from a set of available carriers and/or determining one or more transmission parameters to be used of UL and/or DL transmissions on the carrier. The access point may be a serving access point of thw wireless device. For example, the access point may be responsible for controlling or otherwise coordinating UL wireless transmissions from the wireless device and/or DL wireless transmissions to the wireless device. For example, the serving access point may responsible for triggering such wireless transmissions and/or for allocating resources of the carrier to be used for such wireless transmissions. The carrier may be used in a TDD mode and/or in an FDD mode.

At step 1020, the access node may receive a management frame to the one or more wireless devices. The management frame may indicate the commonly assigned identifier. The management frame may for example include a message for coordinating the sharing of the TXOP, such as the above-mentioned TX indication frame transmitted by AP1.

At step 1030, the access node may send a management frame to the one or more wireless devices. The management frame may indicate the commonly assigned identifier. The management frame may for example include a message for coordinating the sharing of the TXOP, such as the above-mentioned TX indication frame transmitted by AP1.

At step 1040, the access point sends one or more wireless transmissions on the carrier. The one or more wireless transmissions each include an identifier commonly assigned to multiple access points which cooperate by sharing a TXOP. The commonly assigned identifier may be an SSID. Further, the one or more wireless transmissions each include a duration field for indicating a duration for which the carrier is expected to be occupied. The one or more wireless transmissions may include a message for coordinating the sharing of the TXOP, such as the above-mentioned request frame transmitted by AP2. The one or more wireless transmissions may include a message for coordinating the sharing of the TXOP, such as the above-mentioned request frame transmitted by AP2.

In some scenarios, the one or more wireless transmissions may each further include an update indication for controlling updating of the virtual carrier sense timer, such as the above-mentioned INTRA_BSS_NAV_UPDATE field.

Upon reception of one of the one or more wireless transmissions by a wireless device, the identifier matching an identifier of a serving access point of the wireless device causes the wireless device to update a virtual carrier sense timer according to the indicated duration and to control one or more uplink wireless transmissions from the wireless device based on the virtual carrier sense timer. The virtual carrier sense timer can correspond to an intra-BSS NAV.

In some scenarios, upon reception of one of the one or more wireless transmissions by a wireless device the identifier not matching an identifier of a serving access point of the wireless device may cause the wireless device to update a further virtual carrier sense timer according to the indicated duration and to control one or more UL wireless transmissions from the wireless device based on the further virtual carrier sense timer. The further virtual carrier sense timer can correspond to a Basic NAV. The UL wireless transmissions may be UL wireless transmissions from the wireless device to the serving access point. Additionally or alternatively, the UL wireless transmissions could also be directed to other APs, e.g., when utilizing a multi-AP connectivity configuration of the wireless device.

In some scenarios, the access node may send a further wireless transmission to one of the one or more wireless devices. The further wireless transmission may include a TF for scheduling a UL wireless transmission by the wireless device. In this case, the TF may cause the wireless device to perform the UL wireless transmission irrespective of expiry of the virtual carrier sense timer maintained by the wireless device.

Figure 11:
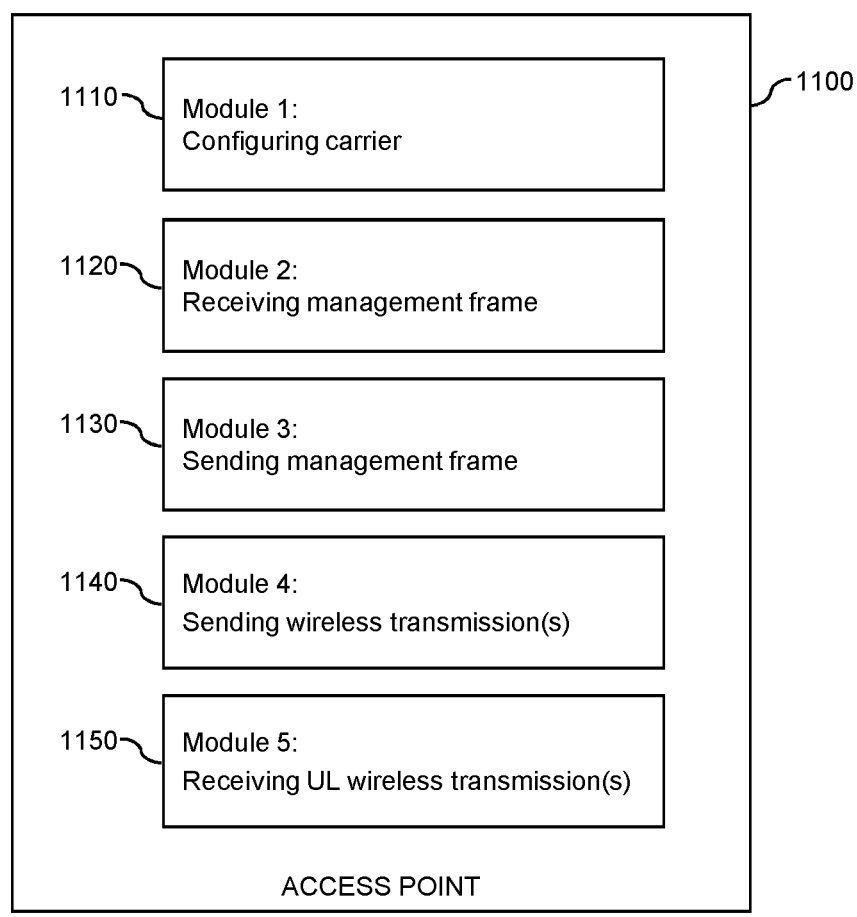
FIG. 11 shows a block diagram for schematically illustrating functionalities of an access point according to a further embodiment.

FIG. 11 shows a block diagram for illustrating functionalities of an access point 1100 which operates according to the method of FIG. 10. The access point 1100 may for example correspond to one of above-mentioned APs 10. As illustrated, the access point 1100 may be provided with a module 1110 configured to configure a carrier for communication with a serving access point, such as explained in connection with step 1010. Further, the access point 1100 may optionally be provided with a module 1120 configured to receive a management frame, such as explained in connection with step 1020. Further, the access point 1100 may optionally be provided with a module 1130 configured to send a management frame, such as explained in connection with step 1030. Further, the access point 1100 may be provided with a module 1140 configured to send one or more wireless transmissions, such as explained in connection with step 1040. Further, the access point 1100 may be provided with a module 1150 configured to receive UL wireless transmissions, such as explained in connection with step 1050.

It is noted that the access point 1100 may include further modules for implementing other functionalities, such as known functionalities of a WLAN AP. Further, it is noted that the modules of the access point 1100 do not necessarily represent a hardware structure of the access point 1100, but may also correspond to functional elements, e.g., implemented by hardware, software, or a combination thereof.

It is noted that the functionalities as described in connection with FIGS. 8 and 9 could also be combined with the functionalities as described in connection with FIGS. 10 and 11, e.g., in a system including at least one wireless device which operates according to the method of FIG. 8, and one or more access points which operate according to the method of FIG. 10.

Figure 12:
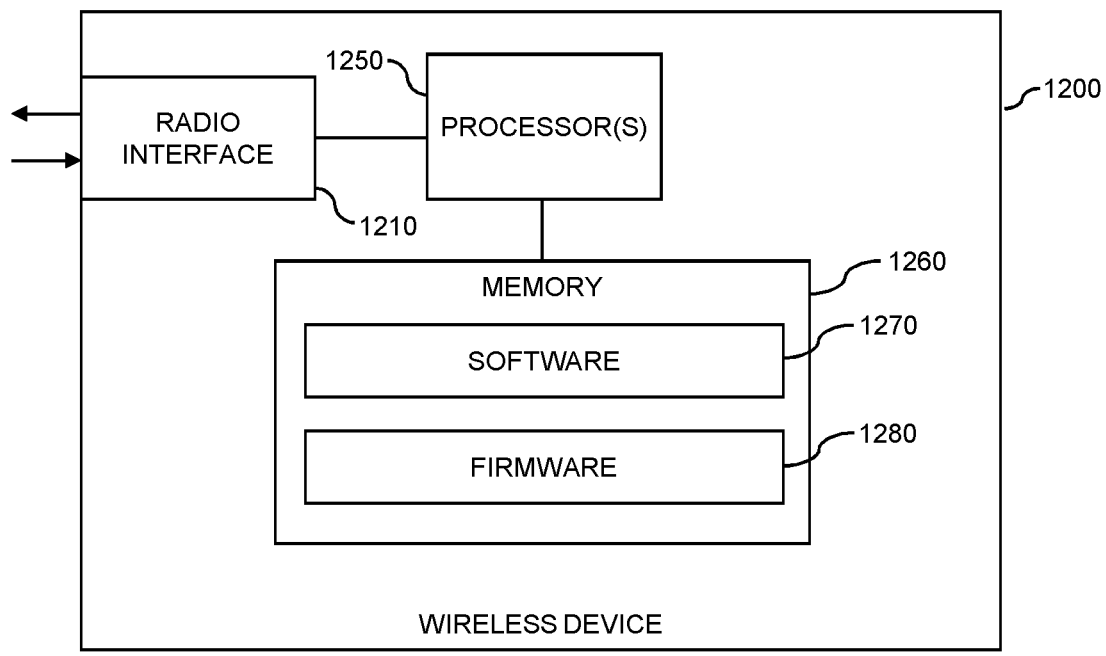
FIG. 12 schematically illustrates structures of a wireless device according to an embodiment.

FIG. 12 illustrates a processor-based implementation of a wireless device 1200 which may be used for implementing the above-described concepts. For example, the structures as illustrated in FIG. 12 may be used for implementing the concepts in any of the above-mentioned stations 11.

As illustrated, the wireless device 1200 includes one or more radio interfaces 1210. The radio interface(s) 1210 may for example be based on a WLAN technology, e.g., according to an IEEE 802.11 family standard. However, other wireless technologies could be supported as well, e.g., the LTE technology or the NR technology.

Further, the wireless device 1200 may include one or more processors 1250 coupled to the radio interface(s) 1210 and a memory 1260 coupled to the processor(s) 1250. By way of example, the radio interface(s) 1210, the processor(s) 1250, and the memory 1260 could be coupled by one or more internal bus systems of the wireless device 1200. The memory 1260 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 1260 may include software 1270 and/or firmware 1280. The memory 1260 may include suitably configured program code to be executed by the processor(s) 1250 so as to implement the above-described functionalities for controlling wireless transmissions, such as explained in connection with FIGS. 8 and 9.

It is to be understood that the structures as illustrated in FIG. 12 are merely schematic and that the wireless device 1200 may actually include further components which, for the sake of clarity, have not been illustrated, e.g., further interfaces or further processors. Also, it is to be understood that the memory 1260 may include further program code for implementing known functionalities of WLAN station. According to some embodiments, also a computer program may be provided for implementing functionalities of the wireless device 1200, e.g., in the form of a physical medium storing the program code and/or other data to be stored in the memory 1260 or by making the program code available for download or by streaming.

Figure 13:
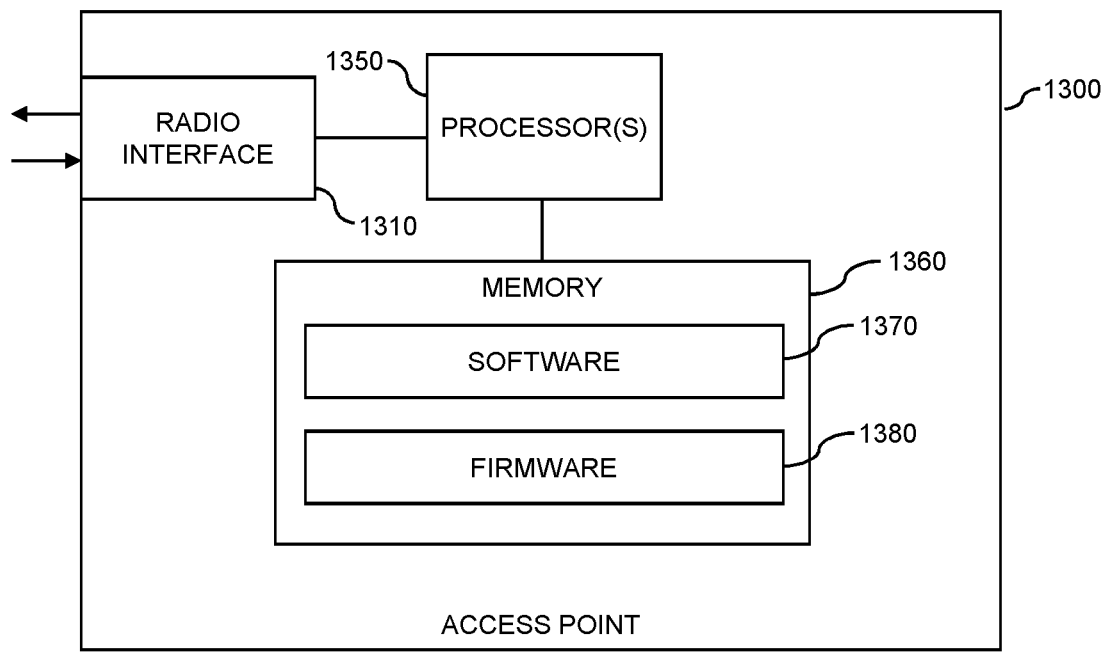
FIG. 13 schematically illustrates structures of an access point according to an embodiment.

FIG. 13 illustrates a processor-based implementation of an access point 1300 which may be used for implementing the above-described concepts. For example, the structures as illustrated in FIG. 13 may be used for implementing the concepts in any of the above-mentioned access points 10.

As illustrated, the access point 1300 includes one or more radio interfaces 1310. The radio interface(s) 610 may for example be based on a WLAN technology, e.g., according to an IEEE 802.11 family standard. However, other wireless technologies could be supported as well, e.g., the LTE technology or the NR technology.

Further, the access point 1300 may include one or more processors 1350 coupled to the radio interface(s) 1310 and a memory 1360 coupled to the processor(s) 1350. By way of example, the radio interface(s) 1310, the processor(s) 1350, and the memory 1360 could be coupled by one or more internal bus systems of the access point 1300. The memory 1360 may include a ROM, e.g., a flash ROM, a RAM, e.g., a DRAM or SRAM, a mass storage, e.g., a hard disk or solid state disk, or the like. As illustrated, the memory 1360 may include software 1370 and/or firmware 1380. The memory 1360 may include suitably configured program code to be executed by the processor(s) 1350 so as to implement the above-described functionalities for controlling wireless transmissions, such as explained in connection with FIGS. 10 and 11.

It is to be understood that the structures as illustrated in FIG. 13 are merely schematic and that the access point 1300 may actually include further components which, for the sake of clarity, have not been illustrated, e.g., further interfaces or further processors. Also, it is to be understood that the memory 1360 may include further program code for implementing known functionalities of an access point. According to some embodiments, also a computer program may be provided for implementing functionalities of the access point 1300, e.g., in the form of a physical medium storing the program code and/or other data to be stored in the memory 1360 or by making the program code available for download or by streaming.

As can be seen, the concepts as described above may be used for efficiently controlling contention-based wireless transmissions, in particular with respect to enabling sharing of TXOP for UL wireless transmissions.

It is to be understood that the examples and embodiments as explained above are merely illustrative and susceptible to various modifications. For example, the illustrated concepts may be applied in connection with various kinds of wireless technologies, without limitation to WLAN technologies. Further, the concepts may be applied with respect to various types of APs and stations. Further, while the illustrated examples involve sharing the TXOP using a TDD scheme, with different APs using different time intervals within the TXOP, the sharing could also additionally or alternatively be based on an FDD scheme, with different APs using different parts of the carrier bandwidth, e.g., based on OFDMA. Moreover, it is to be understood that the above concepts may be implemented by using correspondingly designed software to be executed by one or more processors of an existing device or apparatus, or by using dedicated device hardware. Further, it should be noted that the illustrated apparatuses or devices may each be implemented as a single device or as a system of multiple interacting devices or modules.

In view of the above, embodiments provided in the present disclosure include:

Embodiment 1

A method of controlling wireless transmissions in a wireless communication system, the method comprising:
- a wireless device (11; 900; 1200) configuring a carrier for communication with a serving access point (10; 1100; 1300);
- the wireless device (11; 900; 1200) maintaining a virtual carrier sense timer indicating that the carrier is to be regarded as occupied as long as the virtual carrier sense timer is not expired;
- the wireless device (11; 900; 1200) receiving one or more wireless transmissions on the carrier, the one or more wireless transmissions each including:
  - an identifier commonly assigned to multiple access points (10; 1100; 1300) which cooperate by sharing a transmission opportunity,
  - a duration field for indicating a duration for which the carrier is expected to be occupied; in response to the identifier matching an identifier of the serving access point (10; 1100; 1300), the wireless device (11; 900; 1200) updating the virtual carrier sense timer according to the indicated duration; and
- based on the virtual carrier sense timer, the wireless device (11; 900; 1200) controlling one or more uplink wireless transmissions from the wireless device (11; 900; 1200).

Embodiment 2

The method according to embodiment 1,
wherein the one or more wireless transmissions each further includes an update indication for controlling updating of the virtual carrier sense timer, and
wherein the wireless device (11; 900; 1200) updates the virtual carrier sense timer further in response to the update indication indicating that the virtual carrier sense timer is to be updated.

Embodiment 3

The method according to embodiment 1 or 2, comprising:
the wireless device (11; 900; 1200) receiving a further wireless transmission from the serving access point (10; 1100; 1300), the further wireless transmission comprising a trigger frame for scheduling an uplink wireless transmission by the wireless device (11; 900; 1200); and in response to the trigger frame, the wireless device (11; 900; 1200) performing the uplink wireless transmission irrespective of expiry of the virtual carrier sense timer.

Embodiment 4

The method according to any one of embodiments 1 to 3, comprising:
  the wireless device (11; 900; 1200) maintaining a further virtual carrier sense timer indicating that the carrier is to be regarded as occupied as long as the further virtual carrier sense timer is not expired;
  in response to the identifier not matching an identifier of the serving access point (10; 1100; 1300), the wireless device (11; 900; 1200) updating the further virtual carrier sense timer according to the indicated duration; and
  based on the further virtual carrier sense timer, the wireless device (11; 900; 1200) controlling one or more uplink wireless transmissions from the wireless device (11; 900; 1200).

Embodiment 5

The method according to embodiment 4,
wherein the further virtual carrier sense timer is a Basic Network Allocation Vector.

Embodiment 6

The method according to any one of embodiments 1 to 5,
wherein the virtual carrier sense timer is an intra-Basic Service Set Network Allocation Vector.

Embodiment 7

The method according to any one of embodiments 1 to 6, comprising:
  the wireless device (11; 900; 1200) receiving a management frame from the serving access point (10; 1100; 1300), the management frame indicating the commonly assigned identifier.

Embodiment 8

The method according to any one of embodiments 1 to 7, comprising:
  wherein the management frame comprises a message for coordinating the sharing of the transmission opportunity.

Embodiment 9

The method according to any one of embodiments 1 to 7,
wherein the one or more wireless transmissions comprise a message for coordinating the sharing of the transmission opportunity.

Embodiment 10

The method according to any one of embodiments 1 to 9,
wherein the wireless communication system is based on a Wireless Local Area Network technology according to the IEEE 802.11 standards family.

Embodiment 11

A method of controlling wireless transmissions in a wireless communication system, the method comprising:
  an access point (10; 1100; 1300) configuring a carrier for communication with one or more wireless devices (11; 900; 1200); and
  the access point (10; 1100; 1300) sending one or more wireless transmissions on the carrier, the one or more wireless transmissions each including:
    an identifier commonly assigned to the access point (10; 1100; 1300) and one or more other access points (10; 1100; 1300) which cooperate with the access point (10; 1100; 1300) by sharing a transmission opportunity,
    a duration field for indicating a duration for which the carrier is expected to be occupied, wherein upon reception of one of the one or more wireless transmissions by a wireless device (11; 900; 1200) the identifier matching an identifier of a serving access point (10; 1100; 1300) of the wireless device (11; 900; 1200) causes the wireless device (11; 900; 1200) to update a virtual carrier sense timer according to the indicated duration and to control one or more uplink wireless transmissions from the wireless device (11; 900; 1200) based on the virtual carrier sense timer.

Embodiment 12

The method according to embodiment 11,
wherein the wireless transmission further includes an update indication for controlling updating of the virtual carrier sense timer.

Embodiment 13

The method according to embodiment 11 or 12, comprising:
  the access node sending a further wireless transmission to one of the one or more wireless devices (11; 900; 1200), the further wireless transmission comprising a trigger frame for scheduling an uplink wireless transmission by the wireless device (11; 900; 1200),
  wherein the trigger frame causes the wireless device (11; 900; 1200) to perform the uplink wireless transmission irrespective of expiry of the virtual carrier sense timer maintained by the wireless device (11; 900; 1200).

Embodiment 14

The method according to any one of embodiments 11 to 13,
  wherein upon reception of one of the one or more wireless transmissions by a wireless device (11; 900; 1200) the identifier not matching an identifier of a serving access point (10; 1100; 1300) of the wireless device (11; 900; 1200) causes the wireless device (11; 900; 1200) to update a further virtual carrier sense timer according to the indicated duration and to control one or more uplink wireless transmissions from the wireless device (11; 900; 1200) based on the further virtual carrier sense timer.

Embodiment 15

The method according to embodiment 14,
wherein the further virtual carrier sense timer is a Basic Network Allocation Vector.

Embodiment 16

The method according to any one of embodiments 11 to 15,
wherein the virtual carrier sense timer is an intra-Basic Service Set Network Allocation Vector.

Embodiment 17

The method according to any one of embodiments 11 to 16, comprising:
the access node sending a management frame to the one or more wireless devices (11; 900; 1200), the management frame indicating the commonly assigned identifier.

Embodiment 18

The method according to any one of embodiments 11 to 17, comprising:
wherein the management frame comprises a message for coordinating the sharing of the transmission opportunity.

Embodiment 19

The method according to any one of embodiments 11 to 18,
wherein the one or more wireless transmissions comprise a message for coordinating the sharing of the transmission opportunity.

Embodiment 20

The method according to any one of embodiments 11 to 19,
wherein the wireless communication system is based on a Wireless Local Area Network technology according to the IEEE 802.11 standards family.

Embodiment 21

A wireless device (11; 900; 1200), the wireless device (11; 900; 1200) being configured to:
configure a carrier for communication with a serving access point (10; 1100; 1300);
maintain a virtual carrier sense timer indicating that the carrier is to be regarded as occupied as long as the virtual carrier sense timer is not expired;
receive one or more wireless transmissions on the carrier, the one or more wireless transmissions each including:
an identifier commonly assigned to multiple access points (10; 1100; 1300) which cooperate by sharing a transmission opportunity,
a duration field for indicating a duration for which the carrier is expected to be occupied; in response to the identifier matching an identifier of the serving access point (10; 1100; 1300), update the virtual carrier sense timer according to the indicated duration; and
based on the virtual carrier sense timer, control one or more uplink wireless transmissions from the wireless device (11; 900; 1200).

Embodiment 22

The wireless device (11; 900; 1200) according to embodiment 21,
wherein the wireless device (11; 900; 1200) is configured to perform a method according to any one of embodiments 2 to 10.

Embodiment 23

The wireless device (11; 900; 1200) according to embodiment 21 or 22, comprising:
at least one processor (1250), and
a memory (1260) containing program code executable by the at least one processor (1250),
whereby execution of the program code by the at least one processor (1250) causes the wireless device (11; 900; 1200) to perform a method according to any one of embodiments 2 to 10.

Embodiment 24

An access point (10; 1100; 1300) for a wireless communication system, the access point (10; 1100; 1300) being configured to:
configure a carrier for communication with one or more wireless devices (11; 900; 1200); and
send one or more wireless transmissions on the carrier, the one or more wireless transmissions each including:
an identifier commonly assigned to the access point (10; 1100; 1300) and one or more other access points (10; 1100; 1300) which cooperate with the access point (10; 1100; 1300) by sharing a transmission opportunity,
a duration field for indicating a duration for which the carrier is expected to be occupied,
wherein upon reception of one of the one or more wireless transmissions by a wireless device (11; 900; 1200) the identifier matching an identifier of a serving access point (10; 1100; 1300) of the wireless device (11; 900; 1200) causes the wireless device (11; 900; 1200) to update a virtual carrier sense timer according to the indicated duration and to control one or more uplink wireless transmissions from the wireless device (11; 900; 1200) based on the virtual carrier sense timer.

Embodiment 25

The access point (10; 1100; 1300) according to embodiment 24,
wherein the access point (10; 1100; 1300) is configured to perform a method according to any one of embodiments 12 to 20.

Embodiment 26

The access point (10; 1100; 1300) according to embodiment 24 or 25, comprising:
at least one processor (1350), and
a memory (1360) containing program code executable by the at least one processor (1350), whereby execution of the program code by the at least one processor causes the access point (10; 1100; 1300) to perform a method according to any one of embodiments 11 to 20.

Embodiment 27

A system, comprising:
at least one access point (10; 1100; 1300) and at least one wireless device (11; 900; 1200), the at least one access point (10; 1100; 1300) being configured to:
configure a carrier for communication with one or more wireless devices (11; 900; 1200); and send one or more wireless transmissions on the carrier, the one or more wireless transmissions each including:
  an identifier commonly assigned to the access point (10; 1100; 1300) and one or more other access points (10; 1100; 1300) which cooperate with the access point (10; 1100; 1300) by sharing a transmission opportunity,
  a duration field for indicating a duration for which the carrier is expected to be occupied, and the at least one wireless device (11; 900; 1200) being configured to:
maintain a virtual carrier sense timer indicating that the carrier is to be regarded as occupied as long as the virtual carrier sense timer is not expired;
receive at least one of the one or more wireless transmissions;
in response to the identifier matching an identifier of a serving access point (10; 1100; 1300) of the wireless device (11; 900; 1200), update the virtual carrier sense timer according to the indicated duration; and
control one or more uplink wireless transmissions from the wireless device (11; 900; 1200) based on the virtual carrier sense timer.

Embodiment 28

A computer program or computer program product comprising program code to be executed by at least one processor (1250) of a wireless device (11; 900; 1200), whereby execution of the program code causes the wireless device (11; 900; 1200) to perform a method according to any one of embodiments 1 to 10.

Embodiment 29

A computer program or computer program product comprising program code to be executed by at least one processor (1350) of an access point (10; 1100; 1300), whereby execution of the program code causes the access point (10; 1100; 1300) to perform a method according to any one of embodiments 11 to 20.

The invention claimed is:

1. A method of controlling wireless transmissions in a wireless communication system based on a Wireless Local Area Network technology, the method performed by a wireless device and comprising:
configuring a carrier for communication with a serving access point;
maintaining an intra-Basic Service Set Network Allocation Vector (intra-BSS NAV) indicating that the carrier is to be regarded as occupied as long as the intra-BSS NAV is not expired;
receiving one or more wireless transmissions on the carrier, the one or more wireless transmissions each including:
  a Service Set Identifier (SSID) commonly assigned to multiple access points which cooperate by sharing a transmission opportunity; and
  a duration field for indicating a duration for which the carrier is expected to be occupied;
in response to the SSID matching an SSID of the serving access point, updating the intra-BSS NAV according to the indicated duration; and
based on the intra-BSS NAV, controlling one or more uplink wireless transmissions from the wireless device.

2. The method according to claim 1, wherein the one or more wireless transmissions each further includes an update indication for controlling updating of the intra-BSS NAV, and wherein the wireless device updates the intra-BSS NAV further in response to the update indication indicating that the intra-BSS NAV is to be updated.

3. The method according to claim 1, further comprising:
receiving a further wireless transmission from the serving access point, the further wireless transmission comprising a trigger frame for scheduling a scheduled uplink wireless transmission by the wireless device; and
in response to the trigger frame, performing the scheduled uplink wireless transmission irrespective of expiry of the intra-BSS NAV.

4. The method according to claim 1, further comprising:
maintaining a basic Network Allocation Vector (Basic NAV) indicating that the carrier is to be regarded as occupied as long as the basic NAV is not expired;
in response to the SSID not matching an SSID of the serving access point, updating the basic NAV according to the indicated duration; and
based on the basic NAV, controlling one or more uplink wireless transmissions from the wireless device.

5. The method according to claim 1, further comprising receiving a management frame from the serving access point, the management frame indicating the commonly assigned SSID.

6. The method according to claim 5, further comprising receiving, on the carrier, at least one wireless transmission that includes a Basic Service Set (BSS) Identifier (BSSID) of the serving access point.

7. The method according to claim 5, wherein the management frame comprises a message for coordinating the sharing of the transmission opportunity.

8. The method according to claim 1, wherein the one or more wireless transmissions comprise a message for coordinating the sharing of the transmission opportunity.

9. The method according to claim 1, wherein the method is a method of controlling wireless transmissions in the wireless communication system based on a Wireless Local Area Network technology according to the IEEE 802.11 standards family.

10. A method of controlling wireless transmissions in a wireless communication system based on a Wireless Local Area Network technology, the method performed by an access point and comprising:
configuring a carrier for communication with one or more wireless devices; and
sending one or more wireless transmissions on the carrier, the one or more wireless transmissions each including:
  an SSID commonly assigned to the access point and one or more other access points which cooperate with the access point by sharing a transmission opportunity; and
  a duration field for indicating a duration for which the carrier is expected to be occupied;
wherein, upon reception of one of the one or more wireless transmissions by a wireless device, the SSID matching an identifier of a serving access point of the wireless device causes the wireless device to update an intra-BSS NAV according to the indicated duration and to control one or more uplink wireless transmissions from the wireless device based on a virtual carrier sense timer.

11. The method according to claim 10, further comprising transmitting, on the carrier, at least one wireless transmission that includes a Basic Service Set (BSS) Identifier (BSSID) of the access point.

12. The method according to claim 10, wherein the one or more wireless transmissions each further includes an update indication for controlling updating of the intra-BSS NAV.

13. The method according to claim 10, further comprising sending a further wireless transmission to one of the one or more wireless devices, the further wireless transmission comprising a trigger frame for scheduling a scheduled uplink wireless transmission by the wireless device, wherein the trigger frame causes the wireless device to perform the scheduled uplink wireless transmission irrespective of expiry of the intra-BSS NAV maintained by the wireless device.

14. The method according to claim 10, wherein, upon reception of one of the one or more wireless transmissions by a wireless device, the SSID not matching an SSID of a serving access point of the wireless device causes the wireless device to update a basic NAV according to the indicated duration and to control one or more uplink wireless transmissions from the wireless device based on the basic NAV.

15. The method according to claim 10, further comprising sending a management frame to the one or more wireless devices, the management frame indicating the commonly assigned SSID.

16. The method according to claim 15, wherein the management frame comprises a message for coordinating the sharing of the transmission opportunity.

17. The method according to claim 10, wherein the one or more wireless transmissions comprise a message for coordinating the sharing of the transmission opportunity.

18. The method according to claim 10, wherein the method is a method of controlling wireless transmissions in a wireless communication system based on a Wireless Local Area Network technology according to the IEEE 802.11 standards family.

19. A wireless device for a wireless communication system based on a Wireless Local Area Network technology, the wireless device comprising:
at least one processor, and
a memory containing program code executable by the at least one processor,
whereby execution of the program code by the at least one processor causes the wireless device to configure a carrier for communication with a serving access point;
maintain an intra-BSS NAV indicating that the carrier is to be regarded as occupied as long as the intra-BSS NAV is not expired;
receive one or more wireless transmissions on the carrier, the one or more wireless transmissions each including:
an SSID commonly assigned to multiple access points which cooperate by sharing a transmission opportunity; and
a duration field for indicating a duration for which the carrier is expected to be occupied;
in response to the identifier matching an identifier of the serving access point, update the intra-BSS NAV according to the indicated duration; and
based on the intra-BSS NAV, control one or more uplink wireless transmissions from the wireless device.

20. The wireless device of claim 19, wherein the one or more wireless transmissions each further includes an update indication for controlling updating of the intra-BSS NAV, and wherein the wireless device updates the intra-BSS NAV further in response to the update indication indicating that the intra-BSS NAV is to be updated.

21. The wireless device of claim 19, wherein the wireless device is a wireless device for a wireless communication system based on a Wireless Local Area Network technology according to the IEEE 802.11 standards family.

22. An access point for a wireless communication system based on a Wireless Local Area Network technology, the access point comprising:
at least one processor, and
a memory containing program code executable by the at least one processor,
whereby execution of the program code by the at least one processor causes the access point to:
configure a carrier for communication with one or more wireless devices; and
send one or more wireless transmissions on the carrier, the one or more wireless transmissions each including:
an SSID commonly assigned to the access point and one or more other access points which cooperate with the access point by sharing a transmission opportunity; and
a duration field for indicating a duration for which the carrier is expected to be occupied;
wherein upon reception of one of the one or more wireless transmissions by a wireless device the SSID matching an SSID of a serving access point of the wireless device causes the wireless device to update an intra-BSS NAV according to the indicated duration and to control one or more uplink wireless transmissions from the wireless device based on the intra-BSS NAV.

* * * * *